United States Patent [19]

Chandaria

[11] Patent Number: 5,766,275
[45] Date of Patent: Jun. 16, 1998

[54] FIREPLACE LOG IGNITION SOURCE AND ARTIFICIAL FIREPLACE LOG

[75] Inventor: Ashok Chandaria, Nairobi, South Africa

[73] Assignee: Conros Corporation, Scarborough, Canada

[21] Appl. No.: 784,174

[22] Filed: Jan. 15, 1997

Related U.S. Application Data

[63] Continuation-in-part of Ser. No. 520,062, Apr. 28, 1995, abandoned.

[51] Int. Cl.⁶ .................................................. C10L 5/00
[52] U.S. Cl. ........................ 44/519; 44/532; 44/533; 44/535
[58] Field of Search ........................ 44/519, 531, 532, 44/533, 535

[56] References Cited

U.S. PATENT DOCUMENTS

| | | | |
|---|---|---|---|
| 149,436 | 4/1874 | Byron | 44/519 |
| 2,811,428 | 10/1957 | Smith | 44/519 |
| 3,637,335 | 1/1972 | Uhl | 44/519 |
| 4,040,796 | 8/1977 | Vincent et al. | 44/519 |
| 4,043,765 | 8/1977 | Tanner | 44/519 |
| 4,104,034 | 8/1978 | Wu et al. | 44/519 |
| 4,832,703 | 5/1989 | Campana et al. | 44/519 |
| 5,393,310 | 2/1995 | MacIsaac et al. | 44/519 |

FOREIGN PATENT DOCUMENTS

| | | |
|---|---|---|
| 910712 | 9/1972 | Canada. |
| 1033504 | 6/1978 | Canada. |
| 2109305 | 11/1992 | Canada. |
| 2374404 | 8/1978 | France. |
| 0001814 | 5/1878 | United Kingdom. |

*Primary Examiner*—Prince Willis, Jr.
*Assistant Examiner*—Cephia D. Toomer
*Attorney, Agent, or Firm*—Gowling, Strathy & Henderson; D. Doak Horne

[57] ABSTRACT

A fireplace log ignition source which if desired may be used alone as an artificial fireplace log. A plurality of flammable elongate ignition elements are provided, each being resiliently flexible and having at least one distal end which may be bent so as to extend substantially outwardly from the log and substantially perpendicular thereto, so as to form a plurality of points of possible ignition of the log along its longitudinal length. In a preferred embodiment the ignition elements each comprise a wire, surrounded by a thread coated with a flammable material. A portion of the ignition element contacts the periphery of the artificial fireplace log. The wire therein is resiliently biased so as to maintain the ignition element in gripping engagement with the periphery of the fireplace log. The wire also maintains the ignition element in a desired fixed position after ignition thereof and when burning.

7 Claims, 3 Drawing Sheets

FIREPLACE LOG IGNITION SOURCE AND ARTIFICIAL FIREPLACE LOG

This application is a continuation-in-part of U.S. patent application Ser. No. 08/520,062 filed Apr. 28, 1995, for a "FIREPLACE LOG IGNITION SOURCE AND ARTIFICIAL FIREPLACE LOG", now abandoned.

FIELD OF INVENTION

This invention relates to a fireplace log ignition source which may also be used alone as an artificial fireplace log, having a plurality of protruding ignition elements which form a plurality of points of ignition along the length thereof to assist in ignition of the log.

BACKGROUND OF THE INVENTION

Lighting and ignition of natural wood fireplace logs is often difficult, particularly when kindling, paper, or other ignition sources are not readily available to assist. Persons attempting to ignite synthetic or artificial fireplace logs for fireplaces also experience similar problems.

In the case of artificial fireplace logs, to attempt to overcome difficulties in igniting such fireplace logs, and sufficiently igniting such logs so as to allow them to keep themselves burning, manufacturers of artificial fireplace logs have added various refinements to artificial fireplace logs to assist persons in igniting such logs. For example, U.S. Pat. No. 4,040,776 discloses an artificial firelog having a groove formed along the outer surface of the body, which extends substantially the entire length and which is filled with a gelled starter fuel. The log is further provided with an overwrapper, which, when lit, allows the flame to spread along the gelled fuel in the notch, which is typically oriented in a downwardly facing position in the fireplace and when ignited causes flame to move upwardly so as to thereby fully envelop the firelog and cause it to burn. Similarly, U.S. Pat. No. 4,104,037 teaches an artificial fireplace log, having a strip of readily flammable material applied along the outside of the log, preferably in a groove. U.S. Pat. No. 4,104,034 similarly teaches an artificial fireplace log with a groove in its surface, extending axially along the length of the log. A paper wrapper, with a flap overlying the groove, covers the outside of the log surface. On the inside of the paper wrapper directly opposite the groove is a combustible material, which extends the length of the groove. When the paper flap is lit, the combustible material is easily ignited which in turn causes the log to become uniformly ignited over its length.

Each of the aforementioned designs, due to the necessity of adding a flammable (combustible) material, and further the need to wrap the combustible material with paper to maintain the combustible material in the groove, adds considerably to the cost of manufacture of such artificial fireplace logs.

Other variations, such as the device described in U.S. Pat. No. 3,637,335, wherein solid fuel block comprised of a hydrocarbon wax is contained in a container which further functions as a wick to burn the wax fuel contained therein, are known. In such fuel block, the integral wick in the form of the container package does not function as a means to start the ignition of the fuel block, but rather functions as an actual wick which partially absorbs the liquefied wax to allow the hydrocarbon wax to burn, and is not adapted for use with artificial fireplace logs which are not completely of a hydrocarbon wax and which do not completely liquefy upon application of heat.

Still other devices, such as the device disclosed in U.S. Pat. No. 4,832,703, teach an igniting means 16 comprised of a highly flammable ignition element 84. A single wick 80, reminiscent of a fuse, is affixed thereto by a coating of ignition cream 82 which in addition to assisting ignition, also serves as an adhesive for securing the wick 80 at one end to the ignition element 84. The igniting means 16 may then be located within a pile of charcoal briquettes, and when the single wick 80 is lit, the lit wick 80 subsequently ignites the highly flammable ignition element 84. The ignition element 84 then burns for a short period of time sufficient to ignite the briquettes, and is then exhausted. Notably, the igniting means 16 is highly flammable, and needs to be of a different and more expensive compound than the bulk of the material which it is used to ignite, and as such is of relatively high cost. Moreover, the ignition element 16 is not adapted to be used itself as a firelog, since it is of too highly flammable material and burns for too short a time period. Still further, the existence of a single wick 80, when briquettes are piled about such igniting element 16 is often difficult to locate and place in contact with a match in order to ignite the single wick 80.

Still other devices such as the device disclosed in U.S. Pat. No. 2,811,428 to artificial kindling, teach a central body portion 4 which is preferably of a felted cellulose material, which is coated with a froth of candle wax. An ordinary candle wick 6 is pressed into the top surface, as shown in FIG. 1, to allow the body portion 4, once the wick is ignited, to likewise become ignited. Problematically, however, such a design possesses two drawbacks. Firstly, during shipping, packing and handling, because there is only the pressing of the wick 6 into the body 4 there is no positive gripping force between the wick 6 and the body 4, and frequently the wicks can become detached during shipping and handling from the body 4 with the result that the body 4 becomes difficult if not impossible to light with a match. Secondly, ordinary candle wicks, upon becoming ignited, lose any rigidity due to the liquification of the candle wax therein, and tend to "droop", and thus the flame therefrom does not remain where desired, and may not therefor contact the body, or not optimally contact the body so as to cause immediate ignition thereof.

SUMMARY OF THE INVENTION

To overcome the above problems inherent in the prior art devices, and to provide a fireplace log ignition source which can be easily lit and which can also be used itself as an artificial firelog, the present invention in a broad aspect thereof comprises a synthetic log of flammable material of generally elongate shape, as it typically known in the art. Advantageously, a plurality of elongate, flexible, and flammable ignition elements are provided, which are extendable substantially outwardly from the log in a substantially perpendicular manner. The ignition elements each comprise and/or contain an elongate resiliently flexible member, which is adapted to maintain said ignition element in a desired fixed position after ignition thereof and even when burning, so as to allow the ignition element to remain optimally positioned so as to cause ignition of the artificial fireplace log.

In a preferred embodiment, the resiliently flexible member is a wire member surrounded by a flammable material, which is typically a woven thread, such as a cotton wick which surrounds the wire member, which itself is coated and/or impregnated with a flammable material such as wax. Such elements together make up an ignition element, with a plurality of such ignition elements being arranged on the log. In operation, the fireplace log ignition source of the present invention is placed within natural or other artificial fireplace logs in a position that when ignited is most likely to cause ignition of the fireplace logs. One or more of the ignition elements, which are exposed, are bent to a position where, upon being ignited, the resultant burning thereof will most sufficiently proximate the ignition source so as to cause ignition (burning) of the ignition source, with the resultant ignition of the other fireplace logs. Advantageously, due to containing a non-flammable wire element, even though the ignition element is coated with wax or a material which will liquefy when burnt or subjected to heat and flame, the ignition element will remain in such position due to support from the resilient wire element, thus maintaining the ignition element while burning in optimum position so as to cause ignition of the ignition source, and thereafter the fireplace logs.

In yet a further refinement, the ignition elements have two distal ends, each of which is extendable outwardly from the log in a substantially perpendicular direction, and the ignition elements over a region intermediate their distal ends contact a portion of the periphery of the ignition source (hereinafter "firelog") and is adapted to grippingly engage the periphery of the firelog with which it is in contact. This assists in keeping the ignition elements adhered to the firelog during shipping and handling, so that the ignition elements do not become separate from the firelog.

In the preferred embodiment, the resilient member, namely a wire within the ignition element, is resiliently biased so as to force the ignition element into gripping engagement with the periphery of the firelog so as to thereby assist in maintaining the ignition element in contact with the firelog.

BRIEF DESCRIPTION OF THE DRAWINGS

The following drawings referred to below describe the invention in its preferred embodiments, but the invention is not to be limited to such preferred embodiments. In particular.

DESCRIPTION OF THE PREFERRED EMBODIMENT

Figure 1:
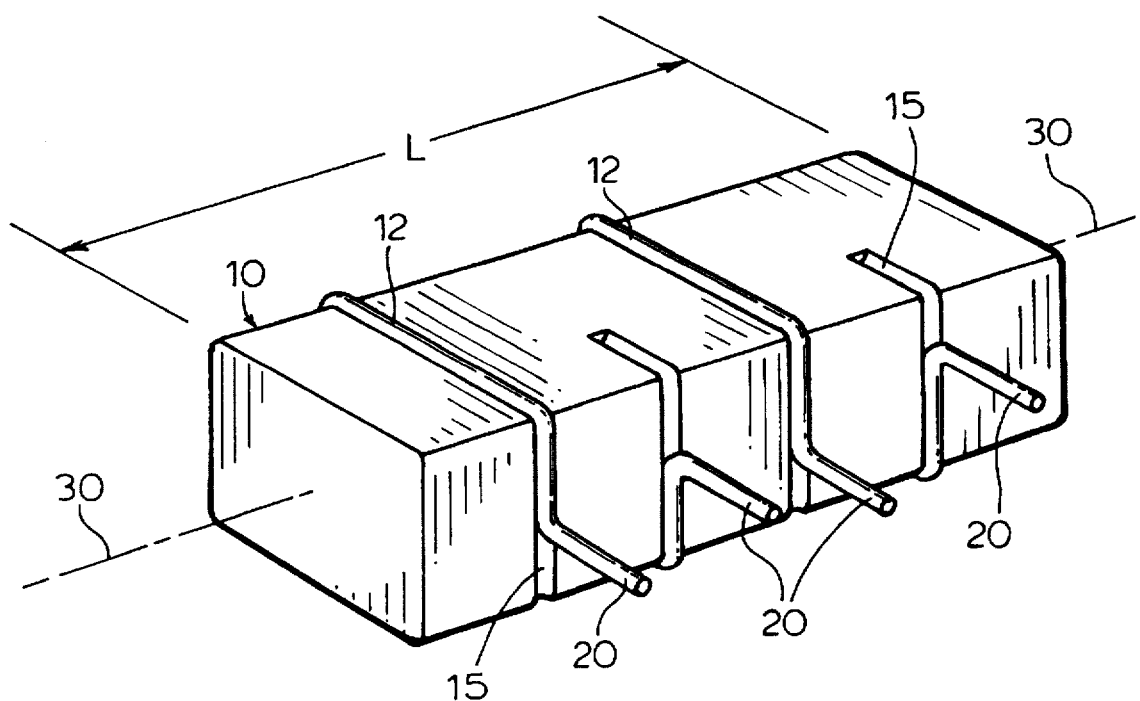
FIG. 1 shows a perspective view of a fireplace log ignition source of the present invention, which may also be used alone as artificial fireplace log.

FIG. 1 shows a fireplace log ignition source 10 ("firelog" or "log") of the present invention, which may also, if desired, be used itself as an easily ignitable fireplace log.

The log 10 is comprised of compressed wood and/or cellulose material 11, compressed and held together by a flammable resin, further containing one or more adjuvants such as paraffin wax and the like, to control and/or assist burning as is commonly known in the art.

The log 10 is of a generally elongate shape, and in the preferred embodiment is of an elongate, prismatic, brick-like configuration.

Figure 4:
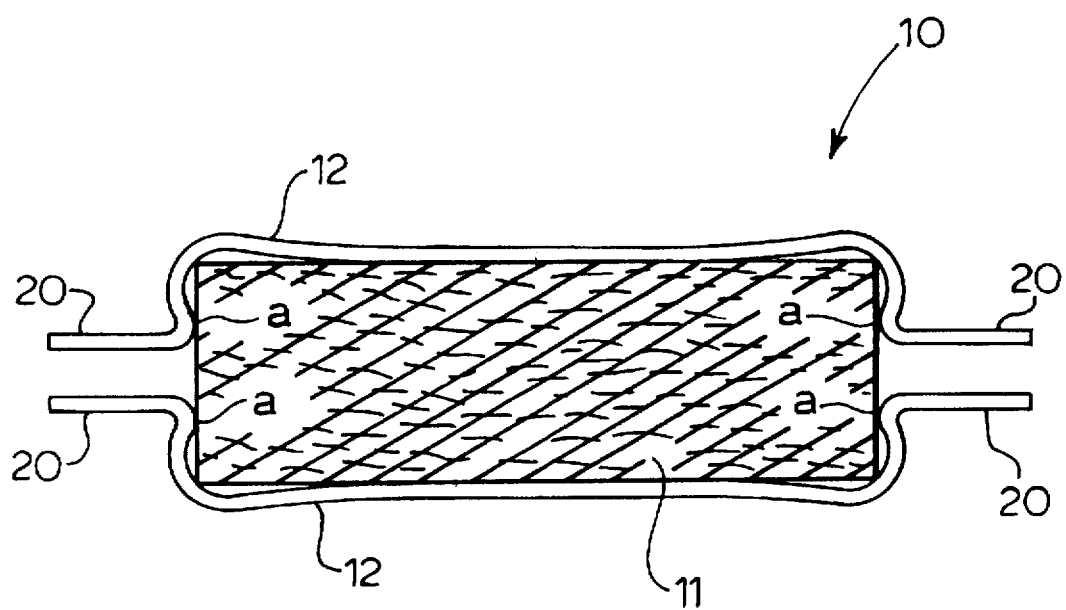
FIG. 4 is an end view of the fireplace log ignition source of the present invention, showing the ignition elements in resiliently biased gripping engagement with the periphery of the firelog.

As best show in FIGS. 1 & 4, a plurality of thin, elongate, flammable ignition elements 12 are provided, each having a distal end 20. The distal ends 20 when the log 10 is manufactured are typically embedded in the periphery of the log 10, as may be seen from vacated portion 15 within log 10 as shown in FIG. 1, but may be bent outwardly by the user at the time of desired ignition of the log 10, so as to expose such distal ends 20 and allow them to protrude outwardly from the log 10 substantially perpendicular to the longitudinal axis 30 of the log 10, so as to form a plurality of points of possible ignition of the log 10 along its length "l". Ignition of as many as possible of the distal ends 20 of the ignition element 12 allows the ignition elements 12 to burn to the exterior surface of the log 10, thereby igniting the exterior surface of the log 10 in a plurality of locations, and thereby causing the log 10 to continue burning even after the distal ends 20 of the ignition elements 12 have been consumed by the burning process.

Figure 2:
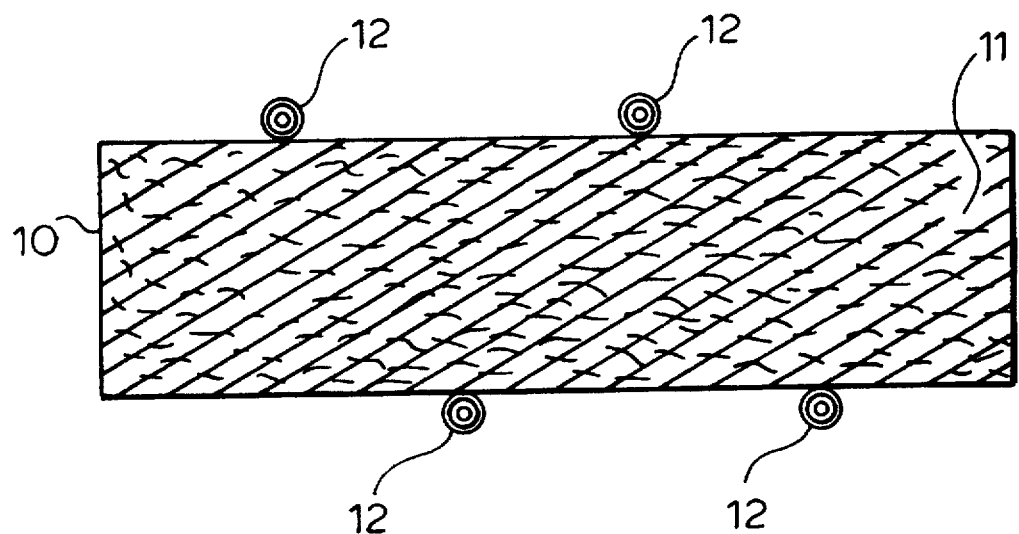
FIG. 2 is a cross-sectional view taken along plane A—A of FIG. 1.

In the preferred embodiment shown in FIG. 1, the ignition elements 12 are partially embedded in the log 10 about a portion of its periphery, in mutually parallel, spaced-apart relation along the length of the log 10. Alternatively, the ignition elements 12 may be completely embedded (not shown) in the log 10, with only a distal end 20 exposed. In the preferred embodiment the ignition elements 12 adhered to the surface of the log 10 as shown in FIG. 2 (cross-section), but the resilient member 16 therewithin (see FIG. 3) is resiliently biased so as to cause the ignition elements 12 to grippingly engage the log 10 about a portion of its periphery, as shown in FIG. 4. In particular, the resilient wire 16 is biased so as to cause the ignition element 12 to "pinch" the log 10 about its periphery in location 'a' in FIG. 4, so as to grippingly secure the ignition element 12 to the log 10.

Figure 3:
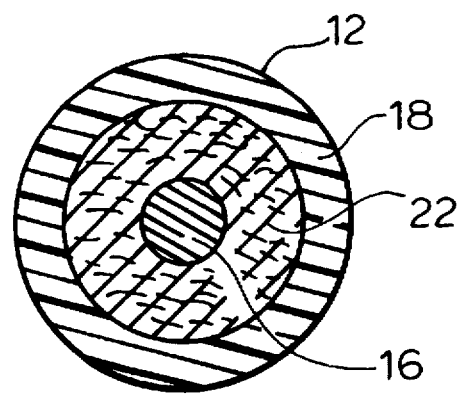
FIG. 3 is an enlarged cross-sectional view of one of the ignition strips shown in FIG. 2.

In the preferred embodiment, the ignition elements 12, as clearly shown in FIG. 3, are comprised of a thin, elongate, resiliently flexible wire 16, typically of a ferro-metallic material. The wire 16 is surrounded by and located within an elongate flammable material 22, which in the preferred embodiment is braided cotton filaments, which are impregnated and/or coated with a flammable but water insoluble and water impermeable material 18, such as paraffin wax. Advantageously, the resiliently flexible metallic wire 16 located within each ignition element 12 allows the ignition element 12, when extended perpendicularly outwardly from the log 10, to maintain such position for easy lighting with a match. If such metallic wire 16 was not in place, the distal ends 20 of the ignition elements 12 would simply fall back into the surface of the log 10, or perhaps away from the log 10, and not remain in the optimum desired position (set by the user) so as to cause ignition of the log 10. The resiliently flexible member 16 proves especially effective upon lighting of the distal ends 20 of the ignition element 12 since any inherent resiliency which the ignition element 12 had due to being impregnated with paraffin wax is immediately lost upon lighting the ignition elements 12 with a match, which immediately causes the paraffin wax to liquefy. The non-flammable wire 16 supports the ignition element 12 even when burning.

In operation, the distal ends 20 of the ignition elements 12 are first bent so as to outwardly extend from the periphery of the log 10, so as to expose them for lighting with a match. The log 10 is then placed adjacent natural wood fireplace logs (not shown) or artificial fireplace logs, that are desired to be lit. As many of the exposed distal ends 20 as possible of the log 10 are lit, which thereby burn proximate the surface of the log 10 in numerous locations, thereby igniting the log 10 in various locations. Once the log 10 is ignited, its continued burning ignites any adjacent fireplace logs.

Alternatively, the log 10, because its burning characteristics are equivalent to normal fireplace logs, may itself be used as the fireplace log. The igniting process is identical to that described above.

Although the disclosure describes preferred embodiments of the invention, the invention is not to be so limited. Other embodiments and variations may now be apparent to those skilled in the art. For a complete definition of the scope of the invention, reference is to be had to appended claims.

I claim:

1. A fireplace log of ignition source which may also be used alone as an artificial fireplace log, comprising:

a synthetic log of flammable material of generally elongate shape;

a plurality of elongate, flexible, flammable ignition elements, each extending substantially perpendicularly outward from said log, each comprising:

a) an elongate, flexible member; and
   b) a filament member surrounding said flexible member, said filament member impregnated with a flammable material;

wherein said flexible member is adapted to maintain said filament member in a desired fixed position after ignition thereof and when burning.

2. The fireplace log as claimed in claim 1, wherein said flexible member is a metallic wire.

3. The fireplace log as claimed in claim 1:

said synthetic log having a periphery;

said ignition elements each having two distal ends, each of which extends substantially perpendicularly outward from said log;

said ignition elements over a region thereof intermediate said distal ends contacting a portion of the periphery of said log and grippingly engaging the log.

4. The fireplace log as claimed in claim 3, said flexible member biased so as to grippingly engage the log about a substantial portion of its periphery.

5. A fireplace log ignition source which may also be used alone as an artificial fireplace log, comprising:

a synthetic log of flammable material of generally elongate shape;

a plurality of elongate, flexible, and flammable ignition elements, each extending substantially outwardly from said log in a substantially perpendicular manner and possessing a flexible wire surrounded by a thread, said thread coated with a flammable material; and said wire being non-flammable and adapted to maintain said ignition element in a desired fixed position after ignition thereof and when burning.

6. The fireplace log as claimed in claimed in claim 5;

said ignition elements having two distal ends, each of which extends substantially outwardly from said log in a substantially perpendicular manner;

said ignition elements over a region intermediate their distal ends contacting a portion of a periphery of said log and grippingly engaging the log.

7. The fireplace log as claimed in claim 6, wherein each wire is resiliently biased so as to force the ignition element to grippingly engage a substantial portion of the periphery of the log.

* * * * *